United States Patent Office 3,466,347
Patented Sept. 9, 1969

3,466,347
COATING COMPOSITIONS COMPRISING DISPERSION GRADE VINYL RESIN, SOLUTION GRADE VINYL RESIN, CARBOXYL CONTAINING ACRYLIC RESIN AND EPOXIDIZED NOVOLAC RESIN FOR ADHERENTLY COATING METAL
Kenneth G. Davis, Wilkinsburg, Pa., assignor to Mobil Oil Corporation, a corporation of New York
No Drawing. Filed Feb. 23, 1966, Ser. No. 529,246
Int. Cl. C08f 29/20, 29/24
U.S. Cl. 260—837    11 Claims

ABSTRACT OF THE DISCLOSURE

Coatings, especially for sanitary cans and the like, are provided in which a dispersion grade vinyl chloride polymer is dispersed in an organic solvent medium having dissolved therein a solution grade vinyl chloride copolymer, an acrylic copolymer containing free carboxyl groups and an epoxidized novolak resin.

---

This invention relates to novel coating compositions and more particularly to coating compositions comprising a dispersion grade vinyl resin and which are suitable for adherently coating metal.

The coating compositions of this invention are particularly well suited for coating the interior metal surfaces of containers and parts therefor, for foodstuffs and products intended for household or industrial use. For example, the present coating compositions may be used to package acidic products such as pickles and the like as well as other products embracing a wide pH range.

Sanitary can coatings suitable for use with food and beverages carry stringent requirements. Such coatings must adhere tenaciously to the metal surface of the container. Further, the coating composition should not be detrimental to the container contents, for example, it should be free from toxic or flavor conferring constituents, and have stability towards constituents present in the product.

The coatings of the present invention possess the above-mentioned requirements for sanitary coatings to a high degree, and, additionally, have properties rendering them ideally suitable for packaging materials other than food products. The coatings of the invention further combine excellent corrosion resistance with good flexibility and adhesion and can be applied at lower fusion temperatures.

The coating compositions of this invention are formulated as a single coat composition, thus obviating the need for a primer coating, though the metal surface can be size coated to improve properties, if desired. The term "size coated" is used to refer to light film weights less than 5 milligrams per square inch and which may be continuous or discontinuous and which are used when extremely corrosive conditions are encountered.

The novel coating compositions within the scope of this invention contain the following components which are broadly identified as follows:

(1) a dispersion grade vinyl chloride polymer;
(2) a solution grade vinyl chloride copolymer;
(3) an epoxidized novolak resin; and
(4) an acrylic copolymer containing free carboxyl groups.

Referring first to the dispersion grade vinyl chloride polymers, these are polymers containing at least approximately 95% by weight of polymerized vinyl chloride, the balance of the polymer being any ethylenically unsaturated material copolymerizable with vinyl chloride, preferably illustrated by vinyl acetate. The preferred polymers consist essentially of vinyl chloride and may be represented by an emulsion polymer containing 100% by weight of vinyl chloride.

In addition to the vinyl chloride content of the copolymer, the vinyl chloride dispersion resin should be of high molecular weight illustrated by an intrinsic viscosity measured in a 1% solution in cyclohexanone at 20° C. of at least 1.0. Additionally, the dispersion grade resin should be in finely divided particulate condition. Commercially available materials suitable for use as the dispersion grade polyvinyl chloride resin component of the invention are illustrated by QYNV, and QYNM, both of which are products of Union Carbide Corporation.

The invention further requires a solution grade vinyl chloride copolymer. These contain a major proportion of copolymerized vinyl chloride, preferably at least 75% by weight of vinyl chloride, with the balance of the polymer constituted by ethylenically unsaturated material other than vinyl chloride and copolymerizable therewith, usually vinyl acetate. The vinyl chloride content of the polymer should not exceed 90% by weight. The term "solution grade" designates a polymer having an intrinsic viscosity measured in a 1% solution in cyclohexanone at 20° C. of less than 0.8, preferably less than 0.6. While the commercial materials VYLF, VYHH and the like are useful, it is preferred to include a small proportion of from 0.5 to 5% by weight of the copolymer of a carboxyl containing monomer, preferably about 1% by weight of maleic acid or anhydride as in the commercial material VMCH (Union Carbide Corp.). The presence of the acidic component is important in providing superior adhesion to metal, though the specific selection of the solution grade vinyl chloride copolymer is a secondary aspect of this invention.

The epoxidized novolak resin is formed by the epoxidization of a novolak resin which is a permanently thermoplastic condensation product of phenol and formaldehyde containing less than 1 mol of formaldehyde per mol of phenol and which is condensed in the presence of an acid catalyst, preferably a mineral acid. The reaction involves the formation of methylene bridges and produces clear, fusible and soluble chain-like molecules having the following typical formula:

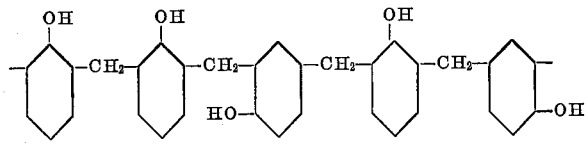

A preferred novolak resin for use in accordance with the invention is disclosed hereinafter.

PREPARATION OF PHENOLIC NOVOLAK

Thirteen hundred parts of phenol (13.8 moles) and 6.5 parts of oxalic acid crystals are mixed together in a reactor. The mixture is heated to boiling point and refluxed for 60 minutes (first condensation). Thirty-four and seven-tenths parts of 15% hydrochloric acid, corresponding to 0.4% of 100% HCl on the weight of phenol, is slowly added. The reaction mixture is refluxed for another 35 minutes (second condensation). The reason for the use of both oxalic and hydrochloric acid is that the reaction is more easily controllable at the beginning and the conversion more complete at the end. When the second condensation is completed, 400 parts of cold water are introduced and the reaction mixture cooled to about 75° C. The crude resin is allowed to settle for 30 minutes. After removal of the supernatant layer of water, the resin is dehydrated without vacuum. As soon as the resin is clear at 100° C., sodium hydroxide solution of 36% concentration is added to neutralize the resin; about 30–40% of the quantity equivalent to the acids used is required. The concentration is continued until the resin temperature reaches 115° C. The resin may be further heated for 5–10 minutes under vacuum to degas it. The yield of the resin is about 110% of the weight of the phenol. The viscosity of the 50% resin solution in alcohol is 80–90 centipoises.

Preferred novolak resins for use in the present invention have a phenol to formaldehyde mole ratio of from 0.8–0.9 and preferably have a viscosity in 50% ethanol solution of from 75–150 centipoises.

The novolak resin is epoxidized by reaction with a large excess of epichlorohydrin to convert the bulk of the phenolic hydroxyl groups of the novolak resin into halohydrin ethers which are then dehydrohalogenated by reaction with sodium hydroxide as is common in the production of epoxy resins from polyhydric phenols.

The last component in the mixture is an acrylic resin containing free carboxyl groups. The carboxyl groups are supplied by an ethylenically unsaturated acid, preferably a monocarboxylic acid such as acrylic acid, methacrylic acid, or crotonic acid. Monobutyl maleate may also be used. Other acids such as itaconic acid and fumaric acid are also useful.

The acid content is desirably in an amount of from 1–20%, preferably from 3–15%, and most preferably about 5%. The balance of the polymer is desirably constituted by alkyl ester of acrylic or methacrylic acids, the chain length of the alkyl groups being preferably limited to from 1–4 carbon atoms, with the proportion thereof being inversely proportional to the length of the chain. Thus, ethylhexyl acrylate or methacrylate should not be included in an amount in excess of 10% by weight of the copolymer for, otherwise, incompatibility results. Similarly, the proportion of butyl acrylate or methacrylate should not exceed 50% by weight.

It is particularly preferred to include a proportion of acrylonitrile in the polymer since this adds desirable toughness to the coating. From this standpoint, one may include from 5–25% of acrylonitrile, preferably from 10–20%. Care should be taken not to include more than 25% of acrylonitrile for this introduces incompatibility problems.

It is particularly preferred to include not only the referred to proportions of acrylonitrile, but to also include at least 25% by weight of the copolymer of alkyl methacrylate since the methacrylates appear to provide superior adhesion in the combination. Also, the proportion of methyl methacrylate should be limited (not in excess of 75%) since, if the proportion thereof is excessive, it reduces solubility and compatibility.

The compositions of this invention may be formulated with varying proportions of each component depending upon the properties desired. Thus, the dispersion grade polyvinyl chloride polymer may be used in proportions varying from 10 to 50% by weight. If more than 50% is employed, the film continuity is reduced. If less than 10% is used, poor corrosion resistance results. The solution grade polymer is usually employed in amounts varying from 5 to 30% by weight. If more than 30% is employed, poor viscosity stability results. If less than 5% is employed, poor fusion of the dispersion results. The epoxidized novolak resin may be employed in the range of from 5 to 20% by weight. More than 20% gives fabrication failure while less than 5% results in low gloss films and poor fusion. The acrylic copolymer is used in an amount of from 5 to 20% by weight. More than 20% results in fabrication failure while less than 5% gives poor adhesion of plastisol gaskets.

The proportions referred to above are based on the total weight of resin solids in the composition.

If desired, up to 5% of an unsaturated methylol-containing phenyl ether having air drying properties may be employed to improve adhesion to size coated substrates. Preferably, at least 2% of this agent is present, but more than 5% leads to dark colored films. These unsaturated air drying phenyl ethers are more fully disclosed in U.S. Patents 2,579,329; 2,579,330; 2,579,331; 2,598,406; 2,606,929; 2,606,935 and 2,707,715 and are typified by 1-allyloxy-2,4,6-tris(hydroxymethyl) benzene produced, for example, as shown in Example VI of U.S. Patent No. 2,606,935. The preferred materials are the monoallyl or methallyl ethers of mono-, di-, or tri-methylol phenol and mixtures thereof.

The vinyl chloride copolymer, the epoxidized novolak resin and the acrylic copolymer are normally provided in the form of an organic solvent solution employing the usual solvents known for this purpose. These are frequently mixtures of inexpensive solvents having minimal solvating power such as aromatic hydrocarbons illustrated by toluene, xylene and the like, and more active solvents for vinyl resins such as ketones illustrated by methyl ethyl ketone and 4-methoxy-4-methyl pentanone-2, and other solvents such as dioxane and dimethyl formamide. Numerous other active solvents are well known to the art. In any event, the final resinous coating compositions contain the various components in an organic solvent medium, the soluble components being dissolved.

The invention is illustrated in the examples which follow in which all parts are by weight. These examples illustrate the best embodiment of the invention as presently understood, but the invention is also applicable to compositions as described hereinbefore. Thus, the acrylic copolymer component in the examples which follow includes a proportion of acrylonitrile to add desirable toughness to the coating as described hereinbefore, but the acrylonitrile is not an essential component.

Example I (I) A solvent mixture of 45 parts of a commercial mixture of aromatic hydrocarbon solvents [1] and 10 parts of pentoxone are charged to a high speed mixer. With agitation, 45 parts of vinyl chloride dispersion grade homopolymer (QYNM) are added and the mixture is stirred until a smooth polyvinyl chloride dispersion is obtained.

(II) A solution copolymer is prepared by dispersing 59 parts of titanium pigment in 41 parts of a 14.4% by weight solution of vinyl copolymer dissolved in a 60/40 blend of aromatic hydrocarbons [1]/isophorone. The copolymer is VMCH which is a copolymer of vinyl chloride/vinyl acetate/maleic acid in a weight ratio of 86/13/1, and having an intrinsic viscosity of 1.35 as determined by the method previously given.

(III) One part of a lubricant (lanolin) and 4 parts of xylene are heated to 110° F. and stirred until the lubricant is dissolved.

(IV) A steam jacketed mixer equipped with an agitator is charged with 15.0 parts of aromatic hydrocarbons [1] and 3.5 parts of the vinyl copolymer employed in step II in the form of a solid powder and the mixture is heated and stirred, to wet the resin. A mixture of 13.7 parts of pentoxone and 2.3 parts of diacetone alcohol are added and agitation continued until the resin is dissolved. Without further heating are added 10.0 parts of a 45% solution of acrylic copolymer dissolved in an 80/20 blend of xylene/pentoxone. The acrylic copolymer comprises by weight, 79% ethyl methacrylate, 5% acrylic acid and 16% acrylonitrile. Also added are 4.5 parts of the epoxidized novolak resin specifically described hereinbefore, 0.5 parts of the lubricant solution described in step III,

---

[1] The solvent employed is a commercial mixed aromatic hydrocarbon solvent, including minor amounts of aliphatic solvent, and having the following typical physical data:

| | |
|---|---|
| Specific gravity at 60/60° F. | 0.8749 |
| Flash, ° F. (Tag closed cup) Min. | 100 |
| Distillation ASTM (D268): | |
| Initial boiling point, ° F. | 306 |
| 10% | 311 |
| 50% | 317 |
| 90% | 327 |
| Dry point, ° F. | 343 |
| Viscosity, cp. at 25° C. | 0.797 |
| K–B value (Toluol–100) | 90 |
| K–B value (after 75% is evaporated) | 98 |
| Mixed aniline point, °C. | 12.0 |
| Percent aromatics | 99.5 |

19.9 parts of the dispersion prepared in step I, and 29.9 parts of the pigmented vinyl copolymer solution prepared in step II. The mixture is stirred to uniform consistency providing a white-pigmented dispersion of the organosol type.

The dispersion is applied to a variety of metals such as tinplate, aluminum and blackplate, baked in the range of 10 minutes at 365° F. to 10 seconds at 550° F., and then fabricated into containers and closures used to package food products.

Example II

Example I is repeated employing the same proportions with the inclusion of 0.7 part of 1-allyloxy-2,4,6-tris (hydroxymethyl) benzene. The composition is applied to size coated substrates and baked as in Example I. Better adhesion to the sized substrate is obtained than with the unmodified composition of Example I.

Example III

Example II is repeated utilizing a commercial mixture of the allyl ethers of mono-, di-, and tri-methylol phenols, this commercial mixture being identified as Methylon 75108 (General Electric), in place of the unsaturated ether specified in Example II. Corresponding results are obtained.

Pigments, dyes, waxes and other non-reactants may be added to the compositions of the invention for decorative purposes and the like, without otherwise materially affecting the significant characteristics of the composition. In addition, the compositions of the invention may be modified with additives to enhance special properties.

The invention is defined in the claims which follow.

I claim:
1. A resinous coating composition suitable for adherently coating metal surfaces and comprising in an organic liquid containing organic solvent for the soluble components of the composition (1) 10-50 parts by weight of dispersion grade vinyl chloride polymer containing at least 95% by weight of vinyl chloride and having an intrinsic viscosity measured in a 1% solution in cyclohexanone at 20° C. of at least 1.0; (2) 5-30 parts by weight of solution grade vinyl chloride copolymer containing a major proportion of vinyl chloride up to about 90% by weight and having an intrinsic viscosity measured in a 1% solution in cyclohexanone at 20° C. of less than 0.8; (3) 5-20 parts by weight of acrylic copolymer containing 1-20% of ethylenically unsaturated carboxylic acid providing free carboxylic groups with the balance of the copolymer being substantially acrylic monomer; and (4) 5-20 parts by weight of an epoxidized novolak resin, said novolak resin having a phenol to formaldehyde mole ratio of 0.8 to 0.9.

2. The composition of claim 1 in which the dispersion grade vinyl chloride polymer is vinyl chloride homopolymer.

3. The composition of claim 1 in which the solution grade vinyl chloride copolymer comprises at least 75% by weight of vinyl chloride.

4. The composition of claim 3 in which the solution grade vinyl chloride copolymer further comprises vinyl acetate and from 1-5% of ethylenically unsaturated carboxylic acid.

5. The composition of claim 4 in which the solution grade vinyl chloride copolymer is a copolymer of vinyl chloride, vinyl acetate and maleic acid in weight proportion of 86/13/1.

6. The composition of claim 3 in which said solution grade vinyl chloride copolymer further comprises vinyl acetate and has an intrinsic viscosity of less than 0.6 measured in a 1% solution of cyclohexanone at 20° C.

7. The composition of claim 1 in which said acrylic copolymer includes from 5-25% of acrylonitrile.

8. The composition of claim 7 in which said acrylic copolymer includes at least 25% by weight of the copolymer of alkyl methacrylate, the alkyl group containing from 1-4 carbon atoms.

9. The composition of claim 8 in which said alkyl methacrylate is methyl methacrylate.

10. The composition of claim 1 in which said composition further includes up to 5% of an unsaturated methylol-containing phenyl ether having air drying properties.

11. The composition of claim 10 in which said unsaturated ether is selected from the group consisting of monoallyl and monomethallyl ethers of mono-, di-, or tri-methylol phenol and mixtures thereof.

References Cited

UNITED STATES PATENTS

| | | | |
|---|---|---|---|
| 3,418,274 | 12/1968 | Caplan | 260—41 |
| 2,951,769 | 9/1960 | McKnight | 260—837 |
| 3,137,666 | 6/1964 | Lox | 260—837 |
| 3,305,602 | 2/1967 | Bromstead | 260—837 |

FOREIGN PATENTS

| | | |
|---|---|---|
| 892,734 | 3/1962 | Great Britain. |
| 961,054 | 6/1964 | Great Britain. |
| 991,905 | 5/1965 | Great Britain. |
| 694,938 | 9/1964 | Canada. |

MURRAY TILLMAN, Primary Examiner

P. LIEBERMAN, Assistant Examiner

U.S. Cl. X.R.

260—32.6, 32.8, 33.6, 41, 836